Patented July 3, 1934

1,964,953

UNITED STATES PATENT OFFICE 1,964,953

MANUFACTURE OF MEDICINAL OILS FROM MINERAL OILS

Arthur Lazar, Associated, Calif., assignor to Associated Oil Company, San Francisco, Calif., a corporation of California No Drawing. Application October 31, 1930, Serial No. 492,614

10 Claims. (Cl. 196—37)

This invention relates to the treatment of mineral oils, or petroleum oils, for the preparation of an oil having high value as a medicinal oil.

It is a principal object of this invention to produce from petroleum oils a colorless, non-fluorescent, odorless, and tasteless medicinal oil which has no injurious effects on the human system.

A further object is to produce such medicinal oils in a more effective manner than heretofore, and, additionally, to recover by-products of great value.

Medicinal oils of the class produced hereby should show complete saturation, which is indicated by an iodine number of zero, and non-reactivity with concentrated sulphuric acid, or a mixture of concentrated sulphuric and nitric acid, or a mixture of concentrated sulphuric acid and small amounts of formaldehyde (formolite reaction).

In the usual preparation of medicinal oils of the class described herein, it has been necessary to treat the petroleum distillate used with strong sulphuric acid, preferably fuming acid, in large quantities. After drawing off the acid sludge after such treatment, the oil has been found to contain a considerable amount of oil-soluble, sulphonated products, principally sulphonic acids. Also the oil contains more or less free mineral acidity in the form of $H_2SO_4$ and $SO_2$. Such products are generally removed by the usual treatment with caustic soda solution. However, the caustic soda not only neutralizes the acid content of the oil, but the soaps formed by such neutralization cause emulsions and such emulsions cannot be broken by heat, but quite often become stiffer with higher temperatures. Therefore it has been customary to break such emulsions by the addition of organic solvents, such as ethyl alcohol and acetone, which have a mutual affinity for oil and water. However, these solvents are costly and it is necessary to recover them which increases the operating costs considerably.

It is therefore a further object of this invention to provide a simplified, economical, and highly efficient process for the manufacture of the desired medicinal oils. This is accomplished by first treating the mineral oil with liquid sulphur dioxide according to the well known Edeleanu process whereby most of the hydrocarbons of unsaturated and aromatic nature are removed, which otherwise would use up a large amount of acid in the treating to follow, leaving a body of highly saturated hydrocarbons. Such body is then treated with fuming sulphuric acid and the acid sludge removed. The acid rate and the strength of the acid will vary within certain limits according to the nature of the stock to be treated. Alkali is then added in the solid or very strong solution form, caustic soda being preferably used, but sodium carbonate or the oxides, hydroxides, and carbonates of an alkaline earth metal, may also be used, the type of alkali being of minor importance and the oil and alkali are thoroughly mixed.

The homogeneous mixture of oil and alkali is then subjected to a distillation under as high vacuum as can be economically produced, together with open steam, especial care being taken to avoid decomposition, or cracking of the oil.

By the use of direct, or indirect, heating, the mixture may be brought to about 600° F. without decomposition of the oil, and the bottoms will contain the sulphonic acids in the form of non-volatile soaps.

This heated oil is preferably discharged into a flash-off fractionating tower, wherefrom two or more cuts, or condensates, may be taken in the usual way to provide medicinal oils of different grades of viscosity and a small overhead may be also taken off the tower to carry off any trace of malodorous substances formed during the distillation.

The bottoms from the tower, containing the sulphonic acids in the form of alkali soaps, prove to be very valuable by-products as they can be used in the manufacture of greases and soluble oils, being equal to or superior in many cases to rosin soaps. They take up water in large quantities and form stable pasty masses which have extended uses as special greases; for instance, rotary tool joint greases which do not lose their affinity for metal surfaces by taking up more water.

The soaps can also be used for the manufacture of soluble oils and certain compounded materials. The amount of alkali used may be considerably decreased by first passing the acid oil through an absorbent material such as filtering clay previous to the addition of the alkali and to the vacuum distillation. Such clay treatment will decrease the acidity of the oil considerably, but not completely, and while such is a desirable economic measure, it is not absolutely necessary to the process. However, in many cases it is recommended inasmuch as the use of such a step prevents the formation of solid crusts of salts in the distillation equipment.

Likewise the use of the preliminary treatment with liquid sulphur dioxide is not necessary, but is preferred to be used inasmuch as this step greatly reduces the quantity of sulfuric acid for producing the necessary refining effect. This reduction in the acid rate not only decreases the material oil losses but also avoids handling and disposal of large quantities of acid sludge.

The high vacuum is obtained by ejectors plus the use of stripping steam at the base of the fractionating tower, the latter being maintained under a total absolute pressure of from 25 to 100 mm. and a partial pressure on the oil is from 25 mm. down to about 5 mm., although it is desired to make the lower limit about a half of a millimeter of mercury. While the use of steam is referred to as optional it is actually much preferred.

I claim as my invention:

1. A process of preparing medicinal oils from petroleum which comprises: treating a body of mineral oil to remove unsaturates, aromatics, and other undesired hydrocarbons therefrom and leave a body of completely saturated hydrocarbons containing a small percentage of non-hydrocarbon products, mixing alkaline material with said body, and distilling said mixture under a high vacuum to separate out said non-hydrocarbon products.

2. A process of preparing medicinal oils from petroleum which comprises: treating a body of mineral oil with liquid sulphur dioxide to remove unsaturates and aromatics therefrom, adding fuming sulphuric acid to said body and removing acid sludge therefrom to leave a body of completely saturated hydrocarbons containing a small percentage of sulfonic impurities, then mixing an alkaline material with said body, and distilling said alkaline body under a high vacuum without decomposition to separate out said impurities.

3. A process of preparing medicinal oils from petroleum which comprises: treating a body of mineral oil with liquid sulphur dioxide to remove unsaturates and aromatics therefrom, adding fuming sulphuric acid to said body and removing acid sludge therefrom to leave a body of completely saturated hydrocarbons containing a small percentage of sulfonic impurities, then mixing an alkaline material with said body, and distilling said alkaline body under a high vacuum up to temperatures of about 600° F. to separate out said impurities.

4. A process of obtaining medicinal oil from petroleum without loss of sulfonic acids which comprises: treating a body of mineral oil with fuming sulfuric acid to remove unsaturates, aromatics, and other undesired hydrocarbons, removing the acid sludge, mixing the thus obtained completely saturated oil containing oil soluble sulfonic acids with fixed alkali to convert the sulfonic acids into non-volatile soaps, and distilling the oil-alkali mixture under high vacuum to obtain the desired oil as a colorless, tasteless liquid, leaving the sulfonic acids as bottoms in the form of alkali soaps.

5. The process of claim 4 in which the distilling temperature runs up to about 600° F.

6. The process of claim 4 in which the process stated is preceded by treating the mineral oil with liquid sulfur dioxid in order to reduce greatly the quantity of fuming sulfuric acid needed in the next step.

7. The process of claim 4 plus the additional step of passing the oil thru an absorbent clay material before mixing the oil and the alkali, this optional step of the process decreasing the required amount of alkali by decreasing the acidity of the oil and also preventing the formation of solid crusts of salts in the distillation step.

8. The process of claim 4 in which the process stated is preceded by treating the mineral oil with liquid sulfur doxid, in order to reduce greatly the quantity of fuming sulfuric acid needed in the next step, and in which process is included the additional step of passing the oil thru an absorbent clay mixture prior to mixing the alkali with the oil.

9. A process of obtaining a colorless, odorless, and tasteless medicinal oil having complete saturation as is indicated by an iodine number of zero, from a petroleum oil which comprises: treating a body of mineral oil with liquid sulfur dioxid to remove most of the hydrocarbons of unsaturated and aromatic nature, treating the body of highly saturated hydrocarbons with fuming sulfuric acid, removing the acid sludge, thoroughly mixing the oil with alkali to convert the acid reaction products into non-volatile soaps, subjecting the homogeneous mixture of oil and alkali to distillation without decomposition of the oil, under a high vacuum at a temperature running to about 600° F., removing the sulfonic acids as bottoms in the form of non-volatile soaps, fractionating the oil, and removing a small overhead so as to carry off any trace of malodorous substances formed during the distillation.

10. The process of claim 9 plus passing the acid oil thru absorbent clay material before mixing the oil and alkali.

ARTHUR LAZAR.